United States Patent
Latarnik et al.

(10) Patent No.: US 6,909,949 B2
(45) Date of Patent: Jun. 21, 2005

(54) METHOD AND ARRANGEMENT FOR DETECTING A PRESSURE LOSS OF TIRES IN MOTOR VEHICLE

(75) Inventors: Michael Latarnik, deceased, late of Friedrichsderf (DE); by Christine Latarnik, legal representative, Friedrichsdorf (DE); by Sylvia Monika Latarnik, legal representative, Friedrichsdorf (DE); by Eva-Maria Latarnik, legal representative, Friedrichsdorf (DE); Martin Griesser, Eschborn (DE); Andreas Köbe, Bensheim (DE); Frank Edling, Frankfurt (DE)

(73) Assignee: Continental Aktiengesellschaft, Hannover (DE)

( * ) Notice: Subject to any disclaimer, the term of this patent is extended or adjusted under 35 U.S.C. 154(b) by 78 days.

(21) Appl. No.: 10/149,773

(22) PCT Filed: Dec. 14, 2000

(86) PCT No.: PCT/EP00/12759

§ 371 (c)(1),
(2), (4) Date: May 21, 2003

(87) PCT Pub. No.: WO01/43996

PCT Pub. Date: Jun. 21, 2001

(65) Prior Publication Data

US 2004/0059481 A1 Mar. 25, 2004

(30) Foreign Application Priority Data

Dec. 15, 1999 (DE) .......................................... 199 60 419
Aug. 22, 2000 (DE) .......................................... 100 41 249
Oct. 11, 2000 (DE) .......................................... 100 50 198

(51) Int. Cl.[7] .......................... B60C 23/00; B60C 23/02; B60C 23/06
(52) U.S. Cl. .......................... 701/36; 701/14; 340/442
(58) Field of Search ................ 701/14, 29, 70, 701/76; 340/442, 443, 444, 445, 448, 671, 626; 73/146.2, 146, 708; 116/34 R

(56) References Cited

U.S. PATENT DOCUMENTS

| | | | | |
|---|---|---|---|---|
| 3,691,524 A | * | 9/1972 | Frost et al. | 340/444 |
| 4,876,528 A | * | 10/1989 | Walker et al. | 340/442 |
| 5,239,469 A | | 8/1993 | Walker et al. | |
| 5,252,946 A | * | 10/1993 | Walker et al. | 340/444 |
| 5,591,906 A | * | 1/1997 | Okawa et al. | 73/146.5 |
| 5,710,539 A | * | 1/1998 | Iida | 340/444 |
| 5,790,016 A | * | 8/1998 | Konchin et al. | 340/448 |
| 6,118,369 A | * | 9/2000 | Boesch | 340/443 |
| 6,304,802 B1 | * | 10/2001 | Stuible et al. | 701/29 |
| 6,439,045 B1 | | 8/2002 | Latarnik et al. | |
| 6,591,668 B1 | | 7/2003 | Becherer et al. | |

FOREIGN PATENT DOCUMENTS

DE          199 61 681        10/2000

* cited by examiner

*Primary Examiner*—Thomas G. Black
*Assistant Examiner*—Dalena Tran
(74) *Attorney, Agent, or Firm*—Walter Ottesen

(57) ABSTRACT

The invention relates to a method for detecting the pressure loss in the tires of a motor vehicle by evaluating the wheel speeds. The pressure evaluating method comprises two or more partial methods Prog A, Prog B, Prog S, Prog V, which each per se represents an independent functional method for measuring the pressure of a motor vehicle tire. The steps of these partial methods are carried out in parallel or quasi parallel. The invention further relates to a device for controlling the braking force and/or dynamics of vehicle movement and for measuring the pressure of vehicle tires. A microprocessor that is linked with the wheel speed sensors and optionally with additional sensors for the dynamics of vehicle movement processes the partial methods described above as well as a method known per se for controlling the braking force and/or dynamics of vehicle movement.

10 Claims, 2 Drawing Sheets

METHOD AND ARRANGEMENT FOR DETECTING A PRESSURE LOSS OF TIRES IN MOTOR VEHICLE

BACKGROUND OF THE INVENTION

This application is the national stage of International Application No. PCT/EP00/12759, filed Dec. 14, 2000, designating the United States.

Motor vehicles, which are equipped with an electronic system for controlling the driving dynamic, such as ABS, ASR or ESP, usually have a unit for measuring the angular velocity of the vehicle wheels. A measurement of the angular velocity of the vehicle wheels can especially take place with the aid of active wheel rpm sensors. It is already known that the monitoring of a change in the angular velocity of the wheels is suitable for tire pressure loss detection. For this purpose, some systems first store the detected wheel velocities in a memory and evaluate these wheel velocities at a later time point. Compared to systems which undertake no storage of data, a conclusion can be drawn as to the actual driving situation from the trace of the wheel velocities so that fluctuations of the wheel angular velocities can be removed from the data which is necessary for an adequate accuracy of the pressure loss detection. The fluctuations of the wheel angular velocities are superposed on the tire pressure loss.

It is common for practically all known tire pressure detection systems that the detection system must first be advised when the desired rated pressure $P_0$ of the mounted wheels is adjusted. This starting condition for the tire pressure detection can be told to the electronic system, for example, by means of a reset switch which must be pressed by the operator of the vehicle. If, after a specific time, a pressure loss occurs at one or more wheels, the tire pressure of the affected wheel drops by the pressure difference AP. As a consequence of the pressure loss, the dynamic rolling radius of the affected wheel changes in a characteristic manner dependent upon the tire. Usually, in known pressure loss detection systems, a pressure loss is detected when the dynamic rolling radius of the affected wheel has reduced by a specific minimum value.

Although many methods for detecting a pressure loss by evaluating the wheel velocity have been suggested, the need is still present to still more reliably and accurately carry out the pressure loss detection on the basis of wheel rpm information The problem in the pressure loss detection is to distinguish a change of the dynamic rolling radius based on a pressure loss from changes of the dynamic rolling radius which, inter alia, can be caused by dynamic driving situations, especially driving in a curve, acceleration, deceleration, et cetera and roadway effects (potholes, various friction values) and, as a rule, are greater than the influence of a pressure loss on the dynamic rolling radius (disturbance effects).

In order to realize a detection of pressure loss with increased accuracy, especially also in dynamic driving maneuvers, German patent application 199 61 681 suggests a method wherein additional physical data, such as yaw rate, acceleration, brake actuation, engine torque, et cetera are included in the detection algorithm so that a pressure loss detection can be carried out also during dynamic driving maneuvers (driving in a curve, acceleration, deceleration, et cetera).

In U.S. Pat. No. 6,439,045, a pressure loss detection method is described, which is integrated into an electronic anti-blocking system (ABS), wherein, after triggering the reset switch, when the rated pressure of the wheels is adjusted, first a time limited learning phase is run through in which a microcontroller follows wheel angular velocities while considering the driving situation and from the time-dependent trace of the reference values, upper and lower limit values ($G_1$ and $G_2$) are fixed. The reference values are formed from the wheel angular velocities. After the learning phase, a comparison phase starts in which a check is made as to whether the actual specific reference values lie within the range defined by the learned limit values.

The method considers the actual driving situation by excluding, during the learning phase and during the comparison phase, reference values during unsuitable dynamic driving situations.

Known methods are limited in that a pressure loss detection can be carried out only during driving situations of low dynamics (for example, essentially during a straight line travel wherein no transverse or longitudinal acceleration acts on the vehicle).

SUMMARY OF THE INVENTION

This task is solved in accordance with the invention by a method according to claim 1 and an arrangement according to claim 11.

The present invention suggests a method for detecting a pressure loss of tires in a motor vehicle during travel. The method is especially suitable for detecting the lowering of tire pressure below a definable threshold value (critical tire pressure).

The pressure loss detection takes place in a manner known per se by evaluating sensor determined angular velocities of all wheels of the motor vehicle or evaluating informations which indicate the angular velocities on the basis of time intervals.

According to the invention, the method for pressure loss detection, however, includes two or more submethods which each are separately operable methods for measuring the pressure in a vehicle tire or for detecting a critical tire pressure.

The steps of the submethods are carried out parallel or quasi parallel in accordance with the invention.

The parallelly processed submethods can be computer programs processed by a microcomputer.

If the submethods are, for example, subprograms, then these subprograms can be so incorporated in a main loop of an operating program that they are called up sequentially during the processing of the main loop. It is also possible that the processing time of a microcomputer, which is made available for the submethods, is subdivided between the individual program parts or in accordance with a time scheme "interrupt controlled". A quasi parallel processing is understood to be, in accordance with the invention, when a procedure is present which is described above.

All submethods are preferably so configured that they output a signal after detecting a pressure loss. The signal is outputted, for example, via a line or even via a data register and contains the information "pressure loss". It is understood that additional signals, which contain an information for identifying the submethod, can be also transmitted via this line or via a further data register.

Preferably, the pressure determining method of the invention includes at least a first submethod and a second submethod. Both submethods generate one or more reference quantities from the angular velocities on the basis of time intervals. The values of the reference quantity are preferably checked as to whether upper and lower limit values $G_1$, $G_2$ are exceeded. The second submethod especially has limit values $^BG_1$, $^BG_2$ which define a narrower range than the limit values $^AG_1$, $^AG_2$ of the first submethod so that $^BG_1 < ^AG_1$ and $^BG_2 > ^AG_2$.

Preferably, the threshold values $^AG_1$ and $^AG_2$ in the first submethod are so selected that a warning is outputted as to a pressure loss for a residual pressure of approximately 1.0 to 1.4 bar. The threshold values $^BG_1$ and $^BG_2$ in the second submethod are preferably so selected that a warning takes place in response to a pressure loss already at a residual pressure of approximately 1.5 to 2.0 bar.

The first submethod responds preferably only to a comparatively large pressure loss. This submethod is therefore provided for driving maneuvers which exhibit a high dynamic. The term "dynamic driving maneuver" is described in the following paragraph. The second submethod responds preferably already to a small pressure loss and is, because of the higher sensitivity, usable only during driving maneuvers having a lower dynamic. The second submethod is so designed that the announcement of the information "pressure loss" is suppressed for tight curves or intense acceleration. In contrast, the first submethod is suitable for pressure loss detection already in more non-quiet (dynamic) driving maneuvers.

Under the term "dynamic driving maneuver", a maneuver is understood in the sense of the invention wherein an influence of the driving condition on the dynamic rolling circumference or the dynamic rolling radius takes place only up to a certain minimum amount. This is, in general, then the case when low acceleration forces operate on the vehicle such as transverse acceleration Q, longitudinal acceleration L or yaw rate ø.

The term "little dynamic driving maneuver" is understood in the sense of the invention to be when no dynamic driving maneuver as described above is present. This is preferably the case when 0 is less than or equal to approximately 0.3 g, L is less than or equal to approximately 0.3 g and ø is less than or equal to approximately 7°/ s. If at least one of the listed quantities lies above the above given limit values, then preferably a dynamic driving maneuver is present.

In a preferred embodiment of the invention, a first submethod and a second submethod are carried out parallel or quasi parallel for determining pressure. The two submethods distinguish from each other in that the second submethod has a narrower limit value range than the first submethod. If the submethods include steps for inquiry or monitoring of acceleration data, then, in general, the learning phase and/or the comparison phase is interrupted when the acceleration values exceed fixed threshold values so that the two respective reference values, which are taken up in the respective method runthrough, are not considered.

The first submethod differs especially from the second submethod in addition in that, in the first submethod, a consideration of the specific reference values takes place only for low dynamic driving situations whereas a consideration of the reference values in the second submethod takes place also during dynamic driving maneuvers. This means that during low dynamic driving maneuvers, both submethods are active simultaneously and during dynamic driving maneuvers, only the second submethod is active.

Preferably, the second submethod is carried out only so long until at least an acceleration value including the longitudinal acceleration and transverse acceleration exhibits a value which is less than or equal to 0.15 g (here, g is the earth acceleration) or the yaw rate exhibits a value of less than or equal to approximately 3°/s. The suppression or the switchoff of a submethod can take place in that either the algorithm for the submethod is called up by the main program in dependence upon the driving situation or, in a submethod, a check of the driving conditions is undertaken.

According to the invention, suitable wheels for the motor vehicle are, for example, conventional tires having standard rims but also new tires having emergency characteristics, especially run-flat wheels having emergency treads or run-flat tires having side walls reinforced for emergency operation. Run-flat wheels having an emergency tread are especially preferred and these emergency treads are mounted on the rim. For generating a velocity pattern, the tread or the emergency tread in a run-flat wheel or tire can be modified in that a defined velocity pattern is generated during rotation of the tire in a flat tire run during travel.

A run-flat wheel, which can preferably be used in accordance with the method of the present invention, is described in U.S. Pat. No. 6,591,668. In a flat-tire run, the emergency tread generates a periodic oscillation which is characteristic for the emergency state and is proportional to the wheel rpm. For this purpose, the emergency tread suitably exhibits discontinuities which are especially preferably configured as cavities or indentations on its rolling circumference.

The emergency tread comes into contact with the inner side of the tire only when the tire pressure is no longer sufficient to carry the load operating on the tire, that is, the tire has transferred into a virtually airless state.

In addition to the first and second submethods, also one or more further submethods can be used in a further preferred embodiment. These submethods are dependent upon the wheel velocity.

Preferably, the pressure determination is carried out in parallel or quasi parallel also by means of a fourth velocity-dependent submethod which detects a velocity pattern of the wheel rpm trace. The velocity-dependent submethod detects the velocity pattern which is generated by a specially structured emergency tread.

As mentioned above, especially structured emergency treads of a run-flat wheel include preferably cavities on the surface which generate an oscillation characteristic for the emergency state when the emergency tread rolls on a roadway. This oscillation can be detected based on the velocity trace of the wheel and is measurable by wheel rpm sensors.

In a further preferred embodiment, the submethods (which are executed parallel or quasi parallel) can also include additionally at least a third submethod which is suitable essentially exclusively for pressure loss detection of tires having an emergency tread mounted within the tire casing. The peculiarity of this submethod is that a pressure loss can be detected from an increase of the angular velocity or of the dynamic rolling radius of one or more wheels compared to a start value of the wheel under consideration after a pressure loss. Here, the surprising effect is utilized that a run-flat wheel or run-flat tire having an emergency tread has lost so much pressure that the tire essentially rolls on the emergency tread and this shows an increase of the dynamic rolling radius, that is, a detectable drop of the wheel velocity.

According to the invention, the detection of the increase of the dynamic rolling radius of a wheel can preferably take place in that:

M1: a check is made as to whether a fixedly pregiven or learned desired value is exceeded by the measured dynamic rolling radius; or, M2: a check is made as to whether the dynamic rolling radius increases after it has previously dropped.

The method M2, which is especially preferred, can also be a method combined with the methods Prog A and Prog B described below. For example, an initially weak drop of the dynamic rolling radius as a consequence of a pressure loss before the tire casing seats on the emergency body can be determined first with the methods Prog A and Prog B. If, thereafter, the dynamic rolling radius increases sharply, then a flat is present. In this case, the emergency tread of the tire is in contact with the casing.

In a further preferred embodiment and according to the method of the invention, a tire pressure loss is exclusively detected in that a check is made whether the angular velocity or the dynamic rolling radius of the observed wheel increases by more than a pregiven threshold value.

By means of the method described above for run-flat wheels having emergency tread, it can (as also by means of the submethod "Prog S") be reliably detected at which time point a contact has occurred between emergency tread and tire casing (flat-tire run). A warning announcement, which is based on the effect of the increase of the dynamic rolling radius considered in accordance with the invention, is comparatively certain and reliable because it is not a relative measurement as in conventional pressure loss detection methods. It is therefore possible to generate additional signals or instructions starting from the occurrence of the flat-tire run. For example, a residual running distance for the tire in the flat-tire run can be displayed. Residual running distances are preferably therefore displayed in accordance with the invention for the tires in the flat-tire run. The residual running distances can especially be dependent upon the type of tire.

According to the invention, it is preferred that the first submethod responds to a high pressure loss, that the second submethod responds to a lower pressure loss and a third and/or fourth parallel or quasi parallelly executed submethod is provided which responds:

- when in a run-flat tire, the angular velocity or the dynamic rolling radius of one or more wheels has increased compared to a starting value of the wheel under consideration after a pressure loss; and/or,
- when, for a vehicle tire having a specially structured emergency tread, a velocity pattern is detected which is characteristic for a tire pressure loss.

Preferably, the method according to the invention is carried out to measure the pressure of the vehicle tires within a method for controlling the braking force and/or the driving dynamic (ABS, ASR, ESP).

The reference quantity Ref, which is used in a preferred embodiment for determining a pressure loss, is preferably formed in that the sums of each two signals, which represent the wheel rpms, are divided.

The outputs of the submethods, which contain information as to a pressure loss, are preferably OR-coupled to a common output. This output can, for example, be connected to a warning lamp in the dashboard.

The method of the invention requires only units which are anyway present in a conventionally used ABS, ASR or ESP system. For this reason, this method can be cost-effectively integrated into such a system in an advantageous manner.

The invention therefore relates also to an arrangement for controlling the braking force and/or the driving dynamic and for detecting a pressure loss of tires which is characterized in that a microcomputer processes an above-described method according to the invention and a method known per se for controlling the braking force and/or driving dynamic. The microcomputer is connected to wheel rpm sensors and, if needed, additional driving dynamic sensors.

BRIEF DESCRIPTION OF THE DRAWING

The invention will now be explained with reference to the drawings wherein.

DESCRIPTION OF THE PREFERRED EMBODIMENTS OF THE INVENTION

Figure 1:
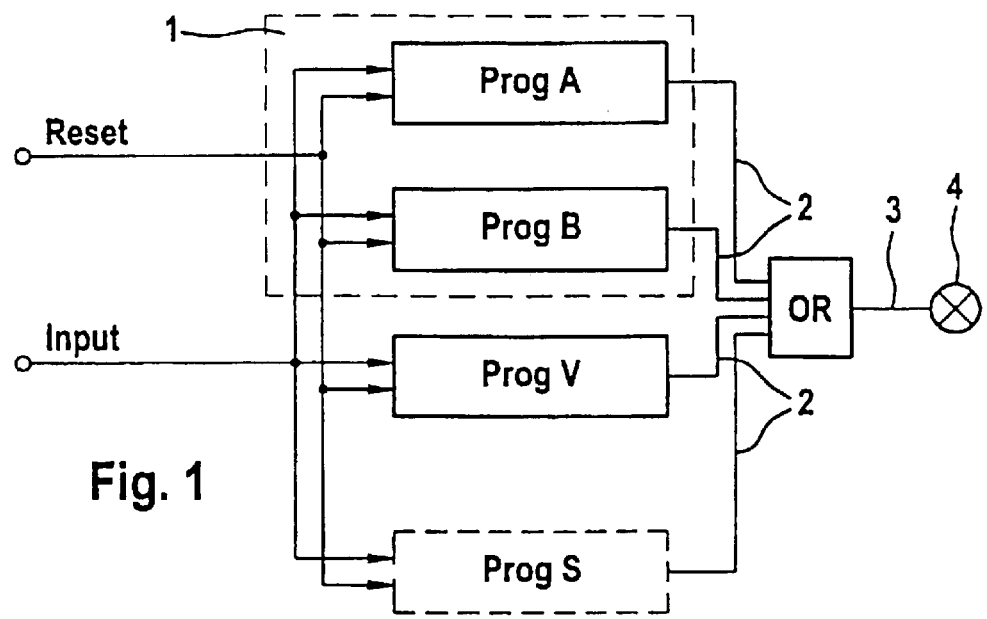
FIG. 1 shows a schematic representation of the submethods for pressure loss detection according to the invention.

In FIG. 1, an example is shown for a method according to the invention having three or four quasi parallel executed submethods Prog A, Prog B, Prog V and/or Prog S.

With a connection "reset", the submethods can be reset to their starting state. Line "input" symbolizes the connection for the signals of the four wheel rpm sensors of the motor vehicle. The submethods have outputs 2 which are combined via a coupling element OR to a common output signal 3. The coupling element OR is an OR coupling. The output signal 3 can be connected to a warning lamp 4.

The unit 1, which is shown in FIG. 1, includes the submethods "Prog A" and "Prog B". With unit 1, a pressure loss detection according to the invention can be carried out for practically all tire types (standard tires, run-flat wheels). The submethods (Prog V, Prog S) are especially suitable for special tires, such as tires having a generating device for a velocity pattern or tires having an emergency tread.

Submethod "Prog V" functions to detect a velocity pattern in the wheel rpm trace. Submethod "Prog S" functions to detect an increase of the dynamic wheel radius. As the submethods "Prog A" and "Prog B", both submethods (Prog V, Prog S) define separately operational methods for measuring the pressure in a tire of a motor vehicle.

Figure 2A:
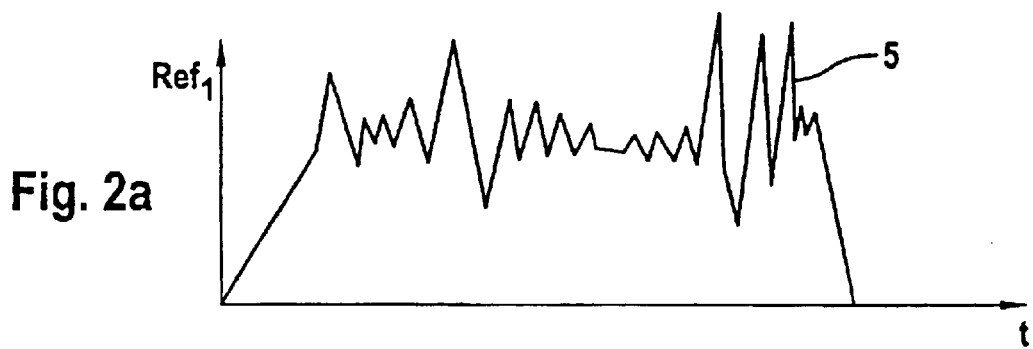
FIG. 2a shows a diagram having a time-dependent trace of a reference value.
Figure 2B:
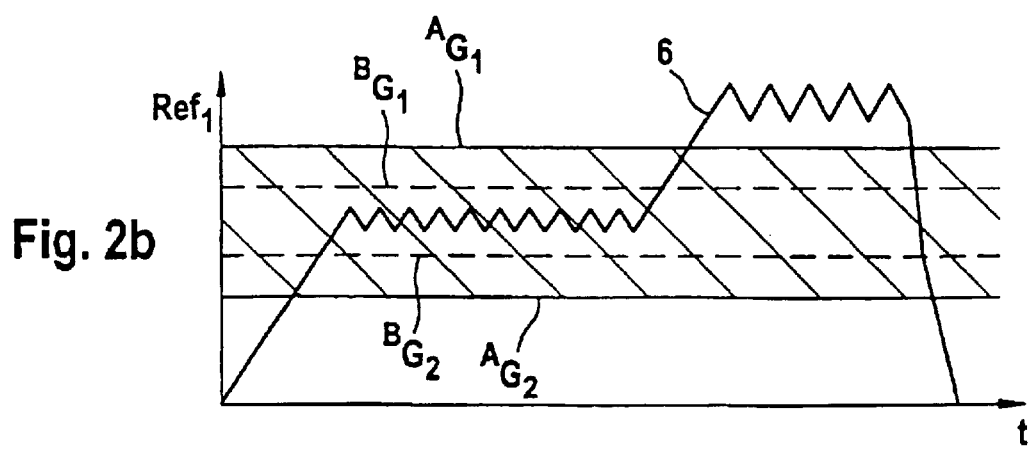
FIG. 2b shows a further diagram having a time-dependent trace of a reference value plus limit values.

As described in greater detail below and as shown in FIG. 2b, the submethod "Prog A" fixes coarse thresholds, fixed by values $^A G_1$ and $^A G_2$, during the learning phase so that an end of the learning phase can take place comparatively fast after the reset by pressing the reset key when filling the tires to the initial rated pressure. Even when, after filling the tire, one drives exclusively so that the vehicle is for a long time in dynamic driving states, the learning method can already be ended after a time of preferably less than approximately one minute.

In the following, an example for pressure loss detection in accordance with the invention is presented in individual steps which define an expansion of the method disclosed in U.S. Pat. No. 6,439,045.

Description of the Method Steps of Prog A (First Submethod):

Step A1:

Picking up the angular velocities by means of wheel sensors of the wheels $w_1$, $w_2$, $w_3$ and $w_4$; wherein: $w_1$ identifies the right forward wheel, $w_2$ the left forward wheel, $w_3$ the right rear wheel and $w_4$ the left rear wheel. Instead of a value for the angular velocity w, a time-dependent quantity T can preferably be used as an index for the wheel velocity, especially, a synchronization to a sensor flank can take place. This affords the advantage of increased accuracy in the determination of the wheel velocities.

Step A2:

Determining comparison values (learning phase) via the steps A2a to A2g.

Step A2a:

Forming reference values in accordance with the equation $$Ref_i=(w_k+w_l)/(w_m+w_n)$$

from current values of w (or, preferably a time T), with the values being determined in accordance with the method under point 1; wherein i=1 ... 3 and the $w_i$ identify different wheels with each reference value.

In FIGS. 2a and 2b, an example is shown for a trace of $Ref_1=(w_k+w_l)/(w_m+w_n)$ in dependence upon the time t; wherein: k=forward left, l=rearward right, m=forward right and n=rearward left. The trace of curve 5 or 6 provides information as to deviations of the dynamic rolling radius for a pressure loss. If all wheels would have the same angular velocity for ideal conditions, then the value of the reference value would be $Ref_1=1$. For a pressure loss, the reference value deviates by a specific amount from the value 1. The trace of $Ref_1$ is, however, dependent by a significantly greater amount on the actual driving conditions such as roadway characteristics, acceleration or driving in a curve.

Step A2b:

Checking whether the driving conditions or driving situation lies in a permissible range. If a driving condition is present which does not appear to be purposeful for forming the reference values (for example, when the longitudinal acceleration, the transverse acceleration or the wheel acceleration exceed specific threshold values), then the submethod is not continued.

Step A2c:

Generating filtered reference values $Ref_i$, for example, by means of a lowpass filter of the first order. The lowpass filtering can be carried out either by evaluating stored data of reference values or by means of a recursion method for lowpass filtering.

Step A2d:

Storing upper and lower limits of the filtered and unfiltered reference values $_iRef^{Max}$ and $_iRef^{Min}$ and generating a mean value $Ref^M$ from the earlier data or recursive generation of a mean value.

Step A2e:

Repeat steps A1 to A2d until the number of determined reference values has reached a value N (N>1, preferably N>5) and check as to whether the difference of $_iRef^{Max}$ and $_iRef^{Min}$ does not exceed a specific threshold value. If this threshold value is exceeded, then the submethod is begun anew.

Step A2f:

Storing upper and lower limit values $_iG_1$, $_iG_2$ in dependence upon the reference values which are determined in the elapsed time span (learn phase); wherein preferably an offset value is added to or subtracted from the mean value $Ref^M$ for forming the limit values.

Step A2g:

Continuing the execution of the program in the program part "comparison phase" which is described under point 3. Description of the Method Steps of Prog B (Second Submethod):

Compared to the method described under point 2, the method steps of Prog A are modified in Prog B in a manner described hereinafter. The method described here corresponds substantially to the method presented in U.S. Pat. No. 6,439,045 for the description of FIG. 2. In this method, a current sample is compared to a sample stored at an earlier time point. The method "Prog B" has a considerably higher time requirement compared to Prog A. For this reason, the method "Prog B" can lead to a successful determination of comparison values when the method of Prog A under point 2 is not suitable to determine comparison values based on a dynamic driving situation.

Step B1:

Picking up the wheel rpm signals of the individual wheels. Here, a check can be made as to whether no driving condition is present which makes it appear not purposeful to form the reference values. When it is detected that such a driving condition is present, the current runthrough of the method is ended. Otherwise, a transition to step B2 takes place.

Step B2:

From the measured wheel rpms, at least one reference value of the reference values $Ref_1$, $Ref_2$, $Ref_3$ is formed as described above. Here too, as likewise described above, a formation of the reference values can take place either via time signals T or by utilizing wheel velocities.

Step B3:

Generating an additional set of data from the determined reference values by lowpass filtering. Here too, the lowpass filtering can be a recursive method which stores only the last filtered value at a current time point.

Step B4:

Check whether the currently determined filtered reference value is greater than the maximum value of the unfiltered reference values determined up to now and, if required, storing the new maximum value. In the same manner, the instantaneously valid minimal value is also determined. Additionally, it can be practical to also continuously determine a mean value from the unfiltered reference values as well as to determine the standard deviation corresponding thereto.

Step B5:

Checking whether a further pregiven number N of reference values was determined, that is, whether a complete sample of reference values was recorded. If this is not the case, then the current runthrough of the method is ended. Otherwise, the method is continued.

Step B6:

Checking whether the maximum value of the filtered reference values of the current recorded sample deviates by no more than a pregiven amount from the maximum value of the filtered reference values of the last stored sample. Furthermore, a check is made in this step whether the minimum value of the described reference values of the current recorded sample deviates by no more than a pregiven amount from the minimum value of the described reference values of the last stored sample. Otherwise, the method is repeated until the condition is satisfied.

Step B7:

If required, checking whether the mean value of the unfiltered reference values of the current sample deviates by no more than a specific amount from the mean value of the unfiltered reference values of the last stored sample. Furthermore, a check takes place, when practical, as to whether the mean value of the unfiltered reference values of the current sample plus as well as minus a multiple of a quality index lies within the limits which are given by the upper limit value and the lower limit value. This multiple can, for example, amount to the fourfold. Otherwise, the method is ended.

Step B8:

Determination of an upper limit value in that an offset value is added to the maximum value of the filtered references values of the current sample. A lower limit value is determined in that an offset value is subtracted from the minimum value of the filtered reference values of the current sample.

If one of the checks yielded the result that the deviations of the values in the current sample were too large, then a transition takes place to step B6 in that the corresponding values of the current sample (mean value, standard deviation of the unfiltered reference values, maximum value and minimum value of the filtered reference values of the current sample) are stored for comparison to future recorded samples.

3) Comparison Phase

Determination of reference values in accordance with point 2a or B2 and computation in accordance with one of the formulas:

$$_iG_1 <_i Ref <_i G_2 \text{ or} \quad \text{(Formula A)}$$

$$_iG_1 <_i Ref^{Filt} <_i G_2, \quad \text{(Formula B)}$$

wherein $_iRef^{Filt}$ can be reference values filtered in a manner known per se. With the computation according to one of the formulas A or B, a check can be made in accordance with the method of the invention as to whether a pressure loss has occurred. If a pressure loss is present, then information as to the pressure loss of the wheel is outputted. If several reference values are formed, that wheel can be individually identified which exhibits the pressure loss from a consideration of the reference values in a practical manner.

Description of the Method Steps of Prog S (Third Submethod):

The method "Prog S" functions to detect a velocity pattern of a special-wheel/tire suitable for generating a velocity pattern. A method usable in accordance with the invention is described in U.S. Pat. No. 6,591,668 mentioned initially-herein. The wheel can be equipped with an emergency tread which is modified for generating the velocity pattern.

Also with this method, the wheel rpm signals of the wheels are detected by the ABS system and are transmitted to the central computer unit. The periodic oscillation, which is proportional to the wheel rpm and characteristic for the emergency state, is generated by an emergency body 10 supported on the rim 12. On its emergency tread 13, the emergency body has a plurality of indentations which are uniformly or non-uniformly distributed over the periphery.

When there is a sudden loss, the emergency tread touches the inner surface of the casing whereby a driving situation is made possible which is sufficiently safe for the emergency state.

According to the method, the wheel velocities are first recorded within defined count times. With the aid of the indentations, periodic oscillations of the n-th order of the tire period (for example, n=13) are generated. These oscillations are proportional to the wheel rpm and are characteristically defined separately. If these oscillations are referred to the mean value of the wheel rpm, then zero crossover times of the rpm output signal can be given. For a conventional tire, the distances of the zero crossover times are essentially constant; whereas, for the special tire used here, significant noticeable periodic deviations of approximately 0.02 milliseconds result.

According to the method given in this example, the set of data from the zero crossover times in dependence upon the time is analyzed via numerical Fourier transformation (FFT). In this way, a spectral power density is obtained plotted as a function of the frequency.

Peaks can be reliably determined based on the data curve having the spectral power density as a function of the frequency with the data curve being obtained in accordance with the transformation. These peaks are caused by the velocity variation of the special tire. To evaluate these signals, specific pregiven frequency ranges of the transformed signal are then integrated. Thereafter, the determined integral values are compared to reference values and/or threshold values and, when a pregiven difference to the reference and/or threshold values is exceeded, a warning signal is outputted to a warning device mounted in the field of view of the driver.

The threshold value, which is used with the method "Prog V" must be selected so large that an increase of the wheel velocities because of disturbance influences can be reliably excluded, for example, via sun radiation on a tire. Suitable values are determined by the technician from driving experiments. The values are dependent in a sensitive manner from the tire and vehicle type.

Figure 3:
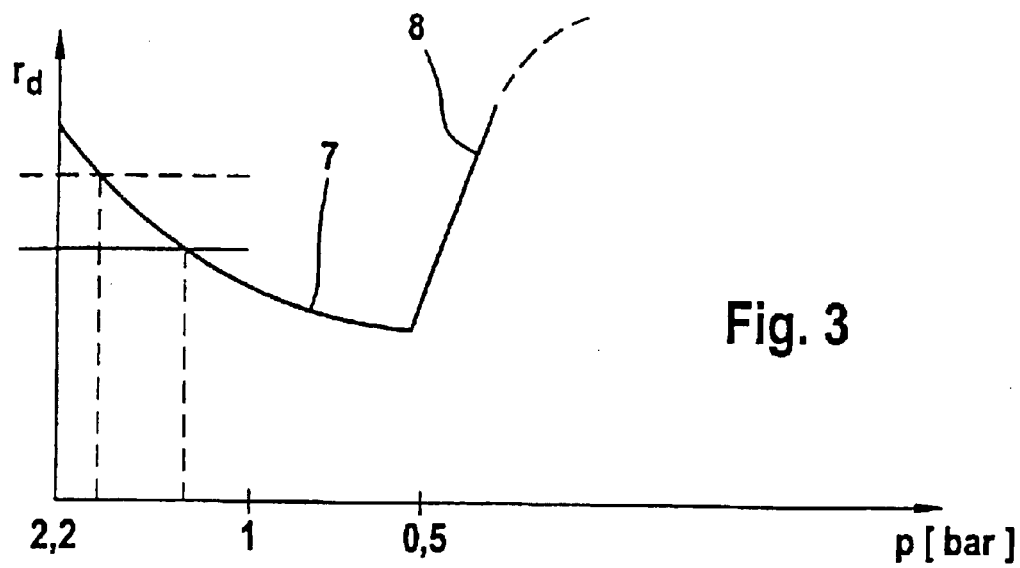
FIG. 3 is a diagram having the trace of the dynamic wheel radius $r_d$ in dependence upon the tire pressure P; and, FIG. 4 is a schematic view of a section of a run-flat wheel having an emergency tread on the rim.
Figure 4:
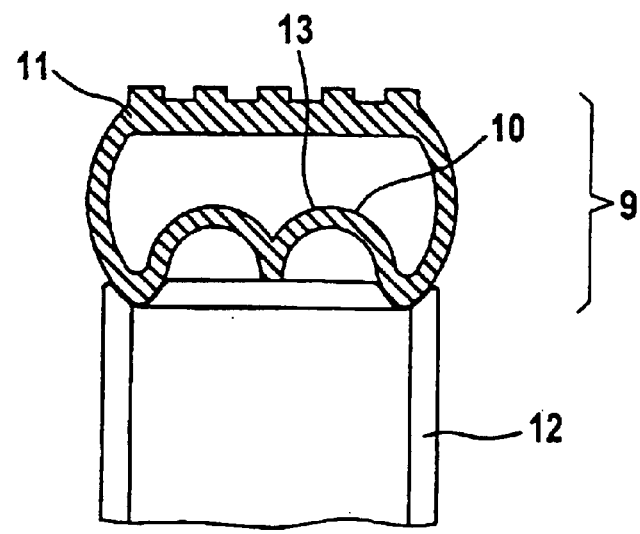

Description of the Method Steps of Prog V (Fourth Submethod):

The operation of Prog V is explained in greater detail with respect to FIGS. 3 and 4. If run-flat wheels 9 are mounted on the motor vehicle, then the dynamic rolling radius $r_d$ first drops in dependence upon tire pressure as in a conventional tire (reference numeral 7). If the pressure loss is so great that the emergency tread 10, which is provided in a run-flat wheel, touches the casing 11 of the tire, then the dynamic rolling radius increases greatly (reference numeral 8).

The method "Prog V" conducts a check as to a drop of the rotational velocity of the wheels which is a consequence of the increase of the dynamic rolling radius $r_d$.

The method for detecting in method "Prog V" can be considerably less sensitive in tires, which show a clear effect, than in the methods "Prog A" and "Prog B". For these tire types, it is already sufficient to monitor the individual wheel velocities or reciprocal wheel velocities (time values) directly as to exceeding (or dropping below) fixed pregiven tire-dependent limit values. Practically, these limit values need not be learned in a learning method in the system; instead, it is possible to store fixedly stored limit values (especially in dependence upon tire type) in a data bank.

What is claimed is:

1. A method for detecting a pressure loss in tires of a motor vehicle during travel including detecting a drop of the pressure below a definable threshold value (critical tire pressure), the method comprising the steps of:

providing sensors for detecting the respective angular velocities of the wheels of said motor vehicle; and, evaluating sensor determined angular velocities of the wheels of said motor vehicle or evaluating informations, which indicate the angular velocities on the basis of time intervals;

providing two or more submethods (Prog A, Prog B, Prog S, Prog V) which are each by themselves a separately operable method for measuring the pressure in a motor vehicle tire or for detecting a critical tire pressure;

carrying out the steps of the submethods in parallel or quasi parallel; and;

wherein said method includes at least a first submethod (Prog A) and a second submethod (Prog B); both submethods generate one or more reference quantities $Ref_1$ from the angular velocities or informations which indicate the angular velocities on the basis of time intervals; and, the reference quantity or quantities are thereafter checked as to whether upper and lower limit values $G_1$ and $G_2$ are exceeded; and, the second submethod (Prog B) has limit values $^BG_1$ and $^BG_2$ which define a narrower range than the limit values $^AG_1$ and $^AG_2$ of the first submethod (Prog A) so that $^BG_1<{}^AG_1$ and $^BG_2>{}^AG_2$.

2. The method of claim 1, wherein at least one of the submethods is a third submethod (Prog S) which detects a velocity pattern of the wheel rpm trace which is generated by a vehicle tire having an especially structured emergency tread.

3. The method of claim 2, wherein the emergency tread has surface cavities which generate an oscillation characteristic for the emergency state during rolling on the emergency tread on a roadway, the oscillation being detectable via wheel rpm sensors.

4. A method for detecting a pressure loss in tires of a motor vehicle during travel including detecting a drop of the pressure below a definable threshold value (critical tire pressure), the method comprising the steps of:

providing sensors for detecting the respective angular velocities of the wheels of said motor vehicle; and, evaluating sensor determined angular velocities of the wheels of said motor vehicle or evaluating informations, which indicate the angular velocities on the basis of time intervals;

providing two or more submethods (Prog A, Prog B, Prog S, Prog V) which are each by themselves a separately operable method for measuring the pressure in a motor vehicle tire or for detecting a critical tire pressure;

carrying out the steps of the submethods in parallel or quasi parallel; and, wherein at least one of the submethods is a fourth submethod (Prog V), which is suitable for pressure loss detection of run-flat wheels having an emergency tread arranged within the tire casing, in that a pressure loss is detected in that the angular velocity drops or the dynamic rolling radius of one or more wheels increases after a pressure loss compared to a start value of the wheel under consideration, when the pressure loss is so great that the run-flat tire essentially rolls on the emergency tread.

5. The method of claim 4, wherein tire pressure loss is only then detected when the angular velocity or the dynamic rolling radius of the wheel under consideration has increased by more than a pregiven threshold value.

6. A method for detecting a pressure loss in tires of a motor vehicle during travel including detecting a drop of the pressure below a definable threshold value (critical tire pressure), the method comprising the steps of:

providing sensors for detecting the respective angular velocities of the wheels of said motor vehicle; and, evaluating sensor determined angular velocities of the wheels of said motor vehicle or evaluating informations, which indicate the angular velocities on the basis of time intervals;

providing two or more submethods (Prog A, Prog B, Prog S, Prog V) which are each by themselves a separately operable method for measuring the pressure in a motor vehicle tire or for detecting a critical tire pressure;

carrying out the steps of the submethods in parallel or quasi parallel; and, wherein a first submethod (Prog A) responds to a high pressure loss, a second submethod (Prog B) responds to a lower pressure loss and a third and/or fourth submethod (Prog S, Prog V) is provided which is carried out in parallel or quasi parallel and responds:

when, for a vehicle tire having a specially procured emergency tread, a velocity pattern is detected which is characteristic for a tire pressure loss and/or when, for a run-flat tire, the angular velocity or the dynamic rolling radius of one or more wheels has dropped compared to a start value of the viewed wheel after a pressure loss.

7. The method of claim 6, wherein the method for measuring the pressure of vehicle tires is carried out within a method for control of the brake force and/or of the driving dynamic (ABS, ASR, ESP).

8. The method of claim 6, wherein the reference quantity $Ref_i$ is formed in that the sums of each two signals, which represent the wheel rpms, are divided.

9. The method of claim 6, wherein the outputs of the submethods, which contain information as to a pressure loss, are OR coupled to a common output.

10. An arrangement for controlling the braking force and/or the driving dynamic and for detecting a pressure loss of tires in a motor vehicle, the arrangement comprising:

sensors for detecting the respective angular velocities of the wheels of said motor vehicle:

a microcomputer connected to said sensors;

said microcomputer functioning to carry out a method including the steps of:

evaluating sensor determined angular velocities of the wheels of said motor vehicle or evaluating informations, which indicate the angular velocities on the basis of time intervals;

providing two or more submethods (Prog A, Prog B, Prog S, Prog V) which are each by themselves a separately operable method for measuring the pressure in a motor vehicle tire or for detecting a critical tire pressure;

carrying out the steps of the submethods in parallel or quasi parallel;

said microcomputer further functioning to carry out a method for controlling the braking force and/or driving dynamic; and, wherein said method includes at least a first submethod (Prog A) and a second submethod Prog B); both submethods generate one or more reference quantities $Ref_i$ from the angular velocities or informations which indicate the angular velocities on the basis of time intervals; and, the reference quantity or quantities are thereafter checked as to whether upper and lower limit values $G_1$ and $G_2$ are exceeded; and, the second submethod (Prog B) has limit values $^BG_1$ and $^BG_2$ which define a narrower range than the limit values $^AG_1$ and $^AG_2$ of the first submethod (Prog A) so that $^BG_1<{}^AG_1$ and $^BG_2>{}^AG_2$.

* * * * *

UNITED STATES PATENT AND TRADEMARK OFFICE
CERTIFICATE OF CORRECTION

PATENT NO. : 6,909,949 B2
DATED : June 21, 2005
INVENTOR(S) : Michael Latarnik et al.

It is certified that error appears in the above-identified patent and that said Letters Patent is hereby corrected as shown below:

Title page, Item [54] and Column 1, line 4,
Title, delete "VEHICLE" and substitute -- VEHICLES -- therefor.

Title page,
Item [75], Inventors, delete "Friedrichsderf" and substitute -- Friedrichsdorf -- therefor.

Column 1,
Line 35, delete "AP" and substitute -- ÄP -- therefor.
Line 46, delete "information" and substitute -- information. -- therefor.

Column 2,
Lines 23 to 25, delete "This task is solved in accordance with the invention by a method according to claim 1 and an arrangement according to claim 11" and substitute -- The present invention has as its object to provide a pressure loss detection on the basis of data of the wheel rpm also during dynamic driving situations. -- therefor.

Column 3,
Line 4, delete "$^b G_1$" and substitute -- $^B G_1$ -- therefor.
Line 37, delete "0" and substitute -- Q -- therefor.

Column 9,
Line 19, delete "$_1 Ref^{Filt}$" and substitute -- $_i Ref^{Filt}$ --.

Column 10,
Line 60, delete "and;" and substitute -- and, -- therefor.
Line 64, delete "$Ref_1$" and substitute -- $Ref_i$ -- therefor.

UNITED STATES PATENT AND TRADEMARK OFFICE
CERTIFICATE OF CORRECTION

PATENT NO.    : 6,909,949 B2
DATED         : June 21, 2005
INVENTOR(S)   : Michael Latarnik et al.

It is certified that error appears in the above-identified patent and that said Letters Patent is hereby corrected as shown below:

Column 12,
Line 30, delete "vehicle:" and substitute -- vehicle; -- therefor.
Line 49, delete "Prog B);" and substitute -- (Prog B); -- therefor.

Signed and Sealed this

Sixteenth Day of August, 2005

JON W. DUDAS
*Director of the United States Patent and Trademark Office*